US010401383B2

(12) United States Patent
Hagmann

(10) Patent No.: US 10,401,383 B2
(45) Date of Patent: Sep. 3, 2019

(54) FREQUENCY COMB FEEDBACK CONTROL FOR SCANNING PROBE MICROSCOPY

(71) Applicant: Mark J. Hagmann, Salt Lake City, UT (US)

(72) Inventor: Mark J. Hagmann, Salt Lake City, UT (US)

( * ) Notice: Subject to any disclaimer, the term of this patent is extended or adjusted under 35 U.S.C. 154(b) by 0 days.

(21) Appl. No.: 16/116,479

(22) Filed: Aug. 29, 2018

(65) Prior Publication Data

US 2018/0364278 A1  Dec. 20, 2018

Related U.S. Application Data

(60) Provisional application No. 62/685,461, filed on Jun. 15, 2018.

(51) Int. Cl.
*G01Q 60/16* (2010.01)
*G01Q 30/20* (2010.01)
*G01Q 60/14* (2010.01)
*G01Q 60/12* (2010.01)

(52) U.S. Cl.
CPC ............ *G01Q 60/16* (2013.01); *G01Q 30/20* (2013.01); *G01Q 60/12* (2013.01); *G01Q 60/14* (2013.01)

(58) Field of Classification Search
CPC ........ G01Q 60/12; G01Q 60/14; G01Q 60/16; G01Q 10/065; G01Q 30/02; G01Q 60/00; G01Q 60/30; B82Y 35/00; G01N 22/00; H01S 5/065
USPC .............................. 250/207; 850/26, 29, 18
See application file for complete search history.

(56) References Cited

U.S. PATENT DOCUMENTS

| 6,153,872 | A | * | 11/2000 | Hagmann | H01J 1/304 250/207 |
| 7,769,062 | B2 | * | 8/2010 | Lu | B82Y 20/00 372/21 |
| 9,153,928 | B2 | * | 10/2015 | Fermann | G01N 21/31 |
| 10,006,933 | B2 | * | 6/2018 | Hagmann | G01Q 60/12 |
| 2002/0171835 | A1 | * | 11/2002 | Haensch | G01N 21/255 356/432 |
| 2008/0285606 | A1 | * | 11/2008 | Kippenberg | G02F 1/39 372/32 |

(Continued)

OTHER PUBLICATIONS

Peak-Seeking Technology for Real-Time Optimization of Complex Systems, National Aeronautics and Space Administration, www.nasa.gov.

*Primary Examiner* — David A Vanore
(74) *Attorney, Agent, or Firm* — Dobbin IP Law P.C.; Geoffrey E. Dobbin

(57) ABSTRACT

In order to meet the needs of the semi-conductor industry as it requires finer lithography nodes, a method of feedback control for scanning probe microscopy generates a microwave frequency comb of harmonics in a tunneling junction by irradiating the junction with mode-locked pulses of electromagnetic radiation. Utilizing power measurements within one or more harmonics, the tip-sample distance in the tunneling junction may be regulated for maximum efficiency and avoid tip crash when used with resistive samples. Optionally, no DC bias is required to use the method. Utilization of this method contributes to true sub-nanometer resolution of images of carrier distribution in resistive samples such as semi-conductors.

7 Claims, 11 Drawing Sheets

(56) References Cited

U.S. PATENT DOCUMENTS

| | | | |
|---|---|---|---|
| 2010/0142566 A1* | 6/2010 | Liu ........................ | B82Y 20/00 |
| | | | 372/18 |
| 2013/0212751 A1* | 8/2013 | Hagmann .............. | B82Y 35/00 |
| | | | 850/26 |
| 2015/0067931 A1* | 3/2015 | Hagmann .............. | G01Q 30/20 |
| | | | 850/18 |
| 2015/0247809 A1* | 9/2015 | Hagmann .............. | G01N 22/00 |
| | | | 850/26 |
| 2016/0356807 A1* | 12/2016 | Hagmann .............. | G01Q 60/10 |
| 2017/0307654 A1* | 10/2017 | Hagmann .............. | G01Q 10/04 |
| 2018/0275164 A1* | 9/2018 | Hagmann .............. | G01Q 30/02 |
| 2018/0364278 A1* | 12/2018 | Hagmann .............. | G01Q 60/16 |

\* cited by examiner

FREQUENCY COMB FEEDBACK CONTROL FOR SCANNING PROBE MICROSCOPY

CROSS-REFERENCES TO RELATED APPLICATIONS

The present Application claims priority as a non-provisional perfection of U.S. Application 62/685,461, filed on Jun. 15, 2018, and incorporates the same by reference in its entirety.

FIELD OF THE INVENTION

The present invention relates to the field of scanning probe microscopy and more particularly relates to a method of controlling tip-sample distance utilizing power measured in a microwave frequency comb in scanning probe microscopy.

BACKGROUND OF THE INVENTION

I. General Concerns

In June of 2017, IBM announced a new process enabling the production of horizontal gate-all-around (GAA) transistors at the 5-nm lithography node. Roadmaps for the semiconductor industry ask that the carrier concentration be measured at a resolution finer than 10 percent of the dimension for each node. However, present instruments have a resolution coarser than 10-nm [W. Vandervorst, A. Schultze, A. K. Kambham, J. Mody, M. Gilbert and P. Eyben, "Dopant/carrier profiling of 3D-structures", Phys. Status Solidi C 11 (2014) 121-129], which is 20 times what the roadmaps would specify for the 5-nm node. These instruments are also unsatisfactory at the 12 and 20-nm nodes which are already in production.

Increased resolution for measurements in quality control is also required for flash memory. Over a 10-year period, in which the steps to finer lithography nodes have increased the chip capacity by 100-fold, the reliability decreased at each step. Thus, the reliable capacity of flash memory has actually "stagnated" [A. A. Chien and V. Karamcheti, "Moore's Law: the first ending and a new beginning", Computer (IEEE) 46 (2013) 48-53]. This may be understood because at each step to a finer node the charge that may be stored in each floating gate is reduced and the rate of dissipation for this charge is increased. Finer measurement resolution is required to improve the reliability.

New manufacturing methods, such as Extreme Ultraviolet lithography (EUV), are being developed for production at the finer lithography nodes but much finer resolution in the measurements is also essential as progress to the finer lithography nodes continues.

Scanning Spreading Resistance Microscopy (SSRM) is generally the method of choice for the semiconductor industry in carrier profiling at and below the 20-nm lithography node [Vandervorst, supra]. In SSRM high pressure is required to insert a diamond probe that must be normal to the surface of a semiconductor to measure the "spreading resistance." This is the electrical resistance as the current spreads outward from the probe into the semiconductor. The carrier concentration is calculated from the measured spreading resistance by comparison with known standards. However, claims for "sub-nanometer" resolution with SSRM [T. Hantschel, C. Demeulemeester, P. Eyben, V. Schulz, O. Richard, H. Bender and W. Vandervorst, "Conductive diamond tips with sub-nanometer electrical resolution for characterization of nanoelectronics device structures", Phys. Stat. Solidi A 206 (2009) 2077-2081] are not reasonable because the diamond probes have an initial diameter of 10-15 nm and blunt to 50 nm or more during a single set of measurements [T. Hantschel, M. Tsigkourakos, J. Kluge, T. Werner, L. Zha, K. Paredis, P. Eyben, T. Nuytten, Z. Xu and W. Vandervorst, "Overcoated diamond tips for nanometer-scale semiconductor device characterization", Microelectron. Eng. 141 (2015) 1-5].

In the new method of Scanning Frequency Comb Microscopy (SFCM) we measure the spreading resistance with a tunneling junction of sub-nanometer size in place of the diamond probe to provide finer resolution while mitigating damage to the semiconductor [M. J. Hagmann, P. Andrei, S. Pandey and A. Nahata, "Possible applications of scanning frequency comb microscopy for carrier profiling in semiconductors", J. Vac. Sci. Technol. B 33 (2015) 02B109]. This new method also shows promise for measurements with fragile 2-D materials such as graphene, as well as with 3-D structures such as FinFETs without requiring their disassembly. In SFCM a passively-mode-locked laser generates microwave power in harmonics at integer multiples of the laser pulse repetition frequency as a "microwave frequency comb" (MFC) [M. J. Hagmann, A. J. Taylor and D. A. Yarotski, "Observation of $200^{th}$ harmonic with fractional linewidth of $10^{-10}$ in a microwave frequency comb generated in a tunneling junction", Appl. Phys. Lett. 101 (2012) 241102] and we determine the spreading resistance by measuring the attenuation that is caused by this resistance [C. Rhoades, J. Rasmussen, P. H. Bowles, M. J. Hagmann and D. A. Yarotski, "First measurements of a microwave frequency comb with a semiconductor sample in a scanning tunneling microscope", Proceedings of the 2016 IEEE Workshop on Microelectronics and Electron Devices (WMED), DOI: 10.1109/WMED.2016.7458278, 4 pp]. The generation and uses of an MFC are described in the Inventor's many prior patents, including U.S. Pat. Nos. 8,601,607; 9,075,081; 9,442,078; and Ser. No. 10/006,933. All these patents being incorporated by reference herein in their entirety.

To summarize the underlying science, when a mode-locked laser is focused on the tunneling junction of a scanning tunneling microscope (STM) with a metal sample, currents at hundreds of harmonics of the laser pulse-repetition frequency are superimposed on the DC tunneling current. Each harmonic, which is believed to be generated by optical rectification, sets the present state-of-the-art for a narrow-linewidth microwave source. The narrow linewidth enables high-accuracy measurements, even at powers of a few attowatts ($1\times 10^{-18}$ Watts) because the signal-to-noise ratio (SNR) exceeds 20-dB—i.e. the desired signal is over 100 times the power of the unwanted noise.

Spectrum analyzers measure the power spectral density (PSD), generally in units of dBm/Hz, over a specified frequency range. The measurements are made with a chosen resolution bandwidth (RBW) that varies inversely with the acquisition time.

The harmonics have an unusually narrow linewidth. In initial measurements using an RBW of 1 Hz, requiring an acquisition time of 1.5 seconds, the apparent linewidth (full-width at half-maximum, FWHM) is 1.2 Hz. However, with an RBW of 0.1 Hz, requiring an acquisition time of 15 seconds, the apparent linewidth is 0.1 $Hz.^2$ The measured power is the same in both sets of data but the apparent peak for the PSD is 10 times greater with the smaller RBW which provides a higher signal-to-noise ratio. We generally use an RBW of 1 Hz to provide a signal-to-noise ratio of 20-dB, but faster acquisition is possible with a proportionately lower signal-to-noise ratio.

As an example, when taking measurements with a metal sample (having less attenuation than a semi-conductor), the inventor measured at the 200th harmonic of 14.85 GHz (such high harmonics are generally not seen with semi-conductor samples due to their inherent resistivity) the linewidth was 1.2 Hz with a spectrum analyzer having an RBW of 1 Hz and was 0.1 Hz with an RBW of 0.1 Hz. However, due to the longer acquisition time with the smaller RBW, about 10 percent of the scans have 2 or more peaks [M. J. Hagmann, F. S. Stenger and D. A. Yarotski, J. Appl. Phys. 114, 223107 (2013)] Thus, it is estimated the coherence time for the laser is about 10 seconds which is consistent with a linewidth of 0.1 Hz. The quality factor (Q) is approximately 14.85 GHz/0.1 Hz≈1.5×10$^{11}$ which sets the present state-of-the-art for a narrow-linewidth microwave source. For comparison, typical values of the Q are 100 for resonant circuits with discrete components, 10$^6$ for metal microwave cavities, and 10$^9$ for superconducting microwave cavities.

In previous work, the inventor and his team measured the first 5 harmonics with intrinsic gallium nitride, a semiconductor, as the sample [Rhodes, supra], but several changes were required in the apparatus and procedures. It is necessary to use a laser with a photon energy less than the bandgap energy of the semiconductor to avoid interference by surge currents that would be caused by creating electron-hole pairs [M. J. Hagmann, S. Pandey, A. Nahata, A. J. Taylor and D. A. Yarotski, Appl. Phys. Lett. 101, 231102 (2012)].

Also, the voltage drop on the spreading resistance in the semiconductor potentiates tip crash, so semiconductor measurements are less stable than those with metal samples. Furthermore, the microwave measurements could not be made in the tip-circuit because inserting a Bias-T or transformer at that point interfered with feedback control of the STM. The measurements could not be made in the sample circuit due to the severe attenuation and dispersion of each carrier pulse as it propagates in the semiconductor. Thus, it was necessary to use a probe on the surface of the semiconductor within 100 μm of the tunneling junction.[3] This Application presents an analysis showing a new mechanism for generating the harmonics with resistive samples, such as semiconductors, which suggests that it would be better to use a new procedure in which there is no applied DC bias and no surface probe is required.

II. Significance of the Spreading Resistance

In 1984 Flores and Garcia described the significance of spreading resistance in scanning tunneling microscopy with semiconductor samples, noting that typically the voltage drop across the spreading resistance exceeds that in the tip-sample gap which causes the DC tunneling current [Phys. Rev. 30, 2289-2291 (1984)]. Scanning Electron Microscope (SEM) images of the tips used with intrinsic gallium nitride show that tip-crash is frequent whereas it seldomly occurs with metal samples, suggesting that the spreading resistance in semiconductors and other resistive samples interferes with the feedback control of the DC tunneling current.

The electrical resistance between a small contact at the surface of an object with resistivity ρ and a second contact having much greater area is independent of the location and size of the larger contact and is called the "spreading resistance." For a circular contact with radius a, the spreading resistance is given by $\rho/4a$ where "ρ" is the resistivity of the object [B. Gelmont and M. Shur, Solid-State Electron. 36, 143-146 (1993)]. There is also a "spreading capacitance" which is given by $4a\varepsilon$ for the circular contact where ε is the permittivity of the object.

Earlier simulations extended the Simmons analysis of quantum tunneling between two parallel flat metal plates to approximate the current density at the surface of the sample in an STM by modeling the tip as a metal sphere and the sample as a flat plate [G. Simmons, J. Appl. Phys. 34, 1793-1803 (1963)]. These new simulations have extended this procedure to approximate the spreading resistance with a resistive sample in an STM. Examples of these simulations are shown in FIGS. 1 and 2. FIG. 1 shows the spot-radius (for a circle containing one-half of the tunneling current) at the surface of a resistive sample as a function of the tip-sample distance and the tip radius. FIG. 2 shows the simulated spreading resistance as a function of the tip radius and the tip-sample distance. The spreading resistance is proportional to the resistivity of the sample and this calculation was made for a value of 1 Ω-cm. Note that the spreading resistance is sharply increased by reducing the radius of the tip, or by reducing the tip-sample distance because that decreases the spot-radius. Thus, the spreading resistance increases as the tip of an STM is moved closer to the sample, while the tunneling resistance is decreased. This effect causes a plot of the current vs. tip-sample distance to level out as the sample's resistivity increases and their separation decreases, as shown in FIG. 3. Note that with samples having resistivity of greater than 0.1Ω-cm, the tunneling current levels out at further and further tip-sample distances, which contributes to incidents of accidental tip crash.

III. Analysis of the Harmonics with a Resistive Sample

A rigorous solution for the harmonics with a semiconductor sample would require modeling the transport of carriers from the tunneling junction to the surface probe [C. Zhu, P. Andrei and M. J. Hagmann, 2017 IEEE Workshop on Microelectronics and Electron Devices (WMED), DOI: 1109/WMED.2017.7916983, 4 pp]. However, in the present analysis we assume that the surface probe is close enough to the tip that the attenuation of the harmonics is primarily caused by the spreading resistance. At this short range the surface probe would receive most of the microwave power.

FIG. 4 is a schematic detailing a tunneling junction in a system to scale, with the tip apex having a radius measuring approximately 1.0 nm, a semi-conductor sample, and the tip-sample distance being about 0.39 nm. As the current propagates through the sample, power in the current is lost due to the spreading resistance of the sample. The drawing shows the approximate extent where 50% of power loss in the current occurs in the sample.

FIG. 5 is an equivalent circuit model for the system utilizing the tip-sample junction shown in FIG. 4 (i.e. connected to a spectrum analyzer). Here "$R_T$" is the tunneling resistance; "$R_{SA}$" is the 50-Ω impedance of the spectrum analyzer; "$C_{SH}$" is the shunting capacitance of the tip and sample leads (≈6 pF); and "$C_S$" and "$R_S$" are the spreading capacitance and spreading resistance in the sample. The high-frequency potential "$V_L$" from the tip-enhanced quasi-static electric field of the laser is imposed across the tunneling junction and the sample. The microwave current, which is generated in the tunneling junction, passes through the sample followed by the parallel circuit of the spectrum analyzer and the capacitive shunt.

A. Equation for the Tip-sample Distance when there is a DC Tunneling Current

The following three equations, which correspond to Eq. 25 in the reference by Simmons, give the tunneling current density J between two parallel flat metal plates, where a factor of 3/2 has been deleted as a typographical error [N. Matthews, M. J. Hagmann and A. Mayer, J. App. Phys. 123, 13601 (2018)]. These equations have been used to approximate the tunneling current density between the tip and a flat sample [M. J. Hagmann and T. E. Henage, Electron. Lett. 52, 395-397 (2016)]. Here $V_{TS}$ is the potential difference across the tip-sample tunneling junction, d is the tip-sample distance, m and e are the mass and charge of the electron, h is the Planck constant, and $\varphi_M$ is the mean value of the work functions for the two electrodes.

$$J = \alpha \frac{V_{TS}}{d} e^{-\beta d} \tag{1}$$

$$\text{where } \alpha = \sqrt{2m\varphi_M e} \left(\frac{e}{h}\right)^2 \tag{2}$$

$$\text{and } \beta = \frac{4\pi}{h}\sqrt{2m\varphi_M e} \tag{3}$$

The tunneling current and the tunneling resistance ($R_T \equiv V_{TS}/I_{DC}$) are given by Eqs. (4) and (5) where A is the effective emitting area of the tip.

$$I_{DC} = \frac{\alpha A V_{TS}}{d} e^{-\beta d} \tag{4}$$

$$R_T = \frac{d}{\alpha A} e^{\beta d} \tag{5}$$

When there is an applied DC bias VB across the spreading resistance and the tunneling junction, we use Eq. (6) to approximate the DC tunneling current:

$$I_{DC} = \frac{V_B}{R_S + R_T} \tag{6}$$

Thus, from Eqs. (5) and (6), we obtain Eq. (7) which is solved iteratively to determine the tip-sample distance d.

$$R_S + \frac{d}{\alpha A} e^{\beta d} - \frac{V_B}{I_{DC}} = 0 \tag{7}$$

B. Equation for the Power Spectral Density (PSD) of the Microwave Harmonics

The quasi-static tip-enhanced near field of a mode-locked laser induces an effective potential $V_L(t)$ across the tip-sample junction and the spreading resistance, which are in series as shown in FIGS. 4 and 5. We approximate this potential with Eq. (8), where the n-th pulse in each pulse-train is centered at time t=nT and the duration of each pulse train is (2N+1)T where $\tau$ is the pulse-width.

$$V_L(t) = V_0 \sum_{n=-N}^{N} e^{-\left(\frac{t-nT}{\tau}\right)^2} \cos[\omega_0(t-nT)] \tag{8}$$

Thus, the potential across the tip-sample junction, $V_T$, is given by Eq. (9) where $Z_S$ is the spreading impedance in the sample:

$$V_T(t) = \frac{V_0 R_T}{(R_T + Z_S)} \sum_{n=-N}^{N} e^{-\left(\frac{t-nT}{\tau}\right)^2} \cos[\omega_0(t-nT)] \tag{9}$$

However, we must also consider the nonlinearity in the resistance of the tunneling junction at optical frequencies, which is a second-order effect. This effect is shown in Eq. (10) where $\gamma$ is a constant with units of inverse volts.

$$I(t) = \frac{V_T(t) + \gamma V_T^2(t)}{R_T} \tag{10}$$

Combining Eqs. (9) and (10) gives the following expression for the current flowing through the tunneling junction and the sample due to nonlinearity caused by the second term in Eq. (10):

$$I_{NL}(t) = \frac{\gamma R_T V_0^2}{(R_T + Z_S)^2} \tag{11}$$

$$\sum_{n=-N}^{N} e^{-\left(\frac{t-nT}{\tau}\right)^2} \cos[\omega_0(t-nT)] \sum_{m=-N}^{N} e^{-\left(\frac{t-mT}{\tau}\right)^2} \cos[\omega_0(t-mT)]$$

$$I_{NL}(t) = \frac{\gamma R_T V_0^2}{(R_T + Z_S)^2} \tag{12}$$

$$\sum_{n=-N}^{N} \sum_{m=-N}^{N} e^{-\left(\frac{t-nT}{\tau}\right)^2} e^{-\left(\frac{t-mT}{\tau}\right)^2} \cos[\omega_0(n-nT)]\cos[\omega_0(t-mT)]$$

Note that the cross-terms with m not equal to n may be deleted because they would have the product of the two exponentials that would be negligible at all values of t because $\tau \ll T$:

$$I_{NL}(t) = \frac{\gamma R_T V_0^2}{(R_T + Z_S)^2} \sum_{n=-N}^{N} e^{-2\left(\frac{t-nT}{\tau}\right)^2} \cos^2[\omega_0(t-nT)] \tag{13}$$

Using a trigonometric identity and deleting all terms at the optical frequencies and their harmonics:

$$I_{NL}(t) = \frac{\gamma R_T V_0^2}{2(R_T + Z_S)^2} \sum_{n=-N}^{N} e^{-2\left(\frac{t-nT}{\tau}\right)^2} \tag{14}$$

Taking the Fourier transform of Eq. (14):

$$I_{NL}(\omega) = \frac{\gamma R_T V_0^2 \tau}{2(R_T + Z_S)^2} e^{-\frac{\tau^2 \omega^2}{8}} \sum_{n=-N}^{N} e^{inT\omega} \tag{15}$$

This current flows through the circuit formed by the spectrum analyzer and the shunting capacitor as shown in FIG. 5. However, $R_{SA}$, the 50Ω input impedance of the spectrum analyzer, is much smaller than $R_S$ and $R_T$, which are typically at least 1 MΩ, so this part of the circuit does not have a significant effect on the total current which is given in Eq. (14). Thus, the Fourier transform for the current through the spectrum analyzer, which is the detector for the measurements, is given by Eq. (16) where time dependence of $e^{j\omega t}$ is assumed:

$$I_S(\omega) = \frac{\gamma V_0^2 \tau}{2(1+j\omega R_{SA}C_{SH})(R_T+Z_S)^2} e^{\frac{-\tau^2\omega^2}{8}} \sum_{n=-N}^{N} e^{inT\omega} \quad (16)$$

The impedance of the parallel combination of the spreading resistance $R_S$ and the spreading capacitance $C_S$ is given by the following expression:

$$Z_S = \frac{R_S}{1+j\omega R_S C_S} = \frac{R_S(1-j\omega R_S C_S)}{1+\omega^2 R_S^2 C_S^2} \quad (17)$$

Thus, the full expression for the Fourier transform of the current through the spectrum analyzer is given by Eq. (18), which is reformatted for Eq. (19).

$$I_S(\omega) = \frac{\gamma R_T V_0^2 \tau}{2(1+j\omega R_{SA}C_{SH})\left(R_T + \frac{R_S(1-j\omega R_S C_S)}{1+\omega^2 R_S^2 C_S^2}\right)^2} e^{\frac{-\tau^2\omega^2}{8}} \sum_{n=-N}^{N} e^{inT\omega} \quad (18)$$

$$I_S(\omega) = \frac{\gamma R_T V_0^2 \tau}{2(1+j\omega R_{SA}C_{SH})\left[\left(R_T + \frac{R_S}{1+\omega^2 R_S^2 C_S^2}\right) - \frac{j\omega R_S^2 C_S}{1+\omega^2 R_S^2 C_S^2}\right]^2} \quad (19)$$
$$e^{\frac{-\tau^2\omega^2}{8}} \sum_{n=-N}^{N} e^{inT\omega}$$

Multiplying by the complex conjugate to obtain the square of the magnitude of $I_S(\omega)$ gives the following:

$$|I_S(\omega)|^2 = \frac{\gamma^2 R_T^2 V_0^4 \tau^2}{4(1+\omega^2 R_{SA}^2 C_{SH}^2)\left[\left(R_T + \frac{R_S}{1+\omega^2 R_S^2 C_S^2}\right)^2 + \left(\frac{\omega R_S^2 C_S}{1+\omega^2 R_S^2 C_S^2}\right)^2\right]^2} e^{\frac{-\tau^2\omega^2}{8}} \sum_{n=-N}^{N} e^{inT\omega} \sum_{m=-N}^{N} e^{-imT\omega} \quad (20)$$

Let "S" represent the double summation in Eq. (20) which is defined as follows:

$$S \equiv \sum_{n=-N}^{N} e^{inT\omega} \sum_{m=-N}^{N} e^{-imT\omega} \quad (21)$$

Simplifying Eq. (21) gives the following expressions:

$$S = \sum_{n=-N}^{N} \sum_{m=-N}^{N} [\cos(nT\omega)+i\sin(nT\omega)][\cos(mT\omega)-i\sin(mT\omega)] \quad (22)$$

$$S = \sum_{n=-N}^{N} \sum_{m=-N}^{N} \left[ \begin{array}{c} \cos(nT\omega)\cos(mT\omega)+\sin(nT\omega)\sin(mT\omega) \\ +i\sin(nT\omega)\cos(mT\omega)-i\cos(nT\omega)\sin(mT\omega) \end{array} \right] \quad (23)$$

The last two lines within the brackets in Eq. (23) sum to zero over the even interval for the summation index to give the real quantity in Eq. (24). A trigonometric identity is used to obtain Eq. (25), and Eq. (26) is obtained as the final expression for the double summation.

$$S = \sum_{n=-N}^{N} \sum_{m=-N}^{N} [\cos(n\omega T)\cos(m\omega T)+\sin(n\omega T)\sin(m\omega T)] \quad (24)$$

$$S = \sum_{n=-N}^{N} \sum_{m=-N}^{N} \left\{ \begin{array}{c} \cos[(n-m)\omega T]+\cos[(n+m)\omega T] \\ +\sin[(n-m)\omega T]-\sin[(n+m)\omega T] \end{array} \right\} \quad (25)$$

$$S = \sum_{n=-N}^{N} \sum_{m=-N}^{N} \cos[(n-m)\omega T] \quad (26)$$

Combining Eqs. (20) and (26) gives the following expression for the square of the magnitude of Fourier transform of the current $I_S(\omega)$:

$$|I_S(\omega)|^2 = \frac{\gamma^2 R_T^2 V_0^4 \tau^2}{4(1+\omega^2 R_{SA}^2 C_{SH}^2)\left[\left(R_T + \frac{R_S}{1+\omega^2 R_S^2 C_S^2}\right)^2 + \left(\frac{\omega R_S^2 C_S}{1+\omega^2 R_S^2 C_S^2}\right)^2\right]^2} e^{\frac{-\tau^2\omega^2}{4}} \sum_{n=-N}^{N} \sum_{m=-N}^{N} \cos[(n-m)\omega T] \quad (27)$$

Equation (28) is an identity that is used with Eq. (27) to obtain a more useful expression for the square of the magnitude $I_S(\omega)$ in Eq. (29), where we have deleted the exponential because we are only interested in the harmonics at microwave frequencies where $\omega\tau \ll 1$.

$$\sum_{n=-N}^{N} \sum_{m=-N}^{N} \cos[(n-m)\omega T] = \frac{\sin^2\left[\left(N+\frac{1}{2}\right)\omega T\right]}{\sin^2\left(\frac{\omega T}{2}\right)} \quad (28)$$

$$|I_S(\omega)|^2 = \frac{\gamma^2 R_T^2 V_0^4 \tau^2}{4(1+\omega^2 R_{SA}^2 C_{SH}^2)\left[\left(R_T + \frac{R_S}{1+\omega^2 R_S^2 C_S^2}\right)^2 + \left(\frac{\omega R_S^2 C_S}{1+\omega^2 R_S^2 C_S^2}\right)^2\right]^2} \frac{\sin^2\left[\left(N+\frac{1}{2}\right)\omega T\right]}{\sin^2\left(\frac{\omega T}{2}\right)} \quad (29)$$

The PSD of the random process $I_H(\omega)$ is given by Eq. (30) where "E" denotes the expectation value of its argument, and the total time-averaged power is given by Eq. (31) [P. Z. Peebles Jr., Probability, Random Variables, and Random Signal Principles, New York, McGraw-Hill, 3rd ed., 1993, p. 202]:

$$P_{II}(\omega) = \lim_{T \to \infty} \frac{E[|I_S(\omega)|^2]}{2T} \quad (30)$$

$$P_{II} = \frac{1}{2\pi} \int_{-\infty}^{\infty} P_{II}(\omega) d\omega \quad (31)$$

In this case $|I_S(\omega)|^2$ has no time-dependence so Eq. (31) may be simplified as follows:

$$P_{II}(\omega) = \lim_{T \to \infty} \frac{\int_{-T}^{T}|I_S(\omega)|^2 dt}{2T} = \lim_{T \to \infty} \frac{2T|I_S(\omega)|^2}{2T} = |I_S(\omega)|^2 \quad (32)$$

The power per unit bandwidth, in watts per Hz, is given by Eq. (33) where the parameter k has units of inverse seconds and $R_{SA}$, the input impedance of the spectrum analyzer, is the load.

$$P(\omega) = \frac{k\gamma^2 R_T^2 R_{SA} V_0^4 \tau^2}{4(1+\omega^2 R_{SA}^2 C_{SH}^2)\left[\left(R_T + \frac{R_S}{1+\omega^2 R_S^2 C_S^2}\right)^2 + \left(\frac{\omega R_S^2 C_S}{1+\omega^2 R_S^2 C_S^2}\right)^2\right]^2} \frac{\sin^2\left[\left(N+\frac{1}{2}\right)\omega T\right]}{\sin^2\left(\frac{\omega T}{2}\right)} \quad (33)$$

For the case when the spreading capacitance may be neglected Eq. (33) simplifies to the following expression:

$$P'(\omega) = \frac{k\gamma^2 R_T^2 R_{SA} V_0^4 \tau^2}{4(1+\omega^2 R_{SA}^2 C_{SH}^2)(R_T+R_S)^4} \frac{\sin^2\left[\left(N+\frac{1}{2}\right)\omega T\right]}{\sin^2\left(\frac{\omega T}{2}\right)} \quad (34)$$

Thus, when the spreading capacitance may be neglected the value at the n-th harmonic, where $\omega=2\pi n/T$, is given by Eq. (35):

$$P'_n = \frac{(2N+1)^2 k\gamma^2 R_T^2 R_{SA} V_0^4 \tau^2}{4\left[1+\left(2\pi n \frac{R_{SA} C_{SH}}{T}\right)^2\right](R_T+R_S)^4} \quad (35)$$

Consider a frequency near the n-th peak where $\varepsilon$ is a small interval of frequency:

$$\omega_{n\varepsilon} = \left(\frac{2\pi n}{T} + 2\pi\varepsilon\right) \quad (36)$$

From Eqs. (34) and (36), near the n-th peak $$P'_{n\varepsilon}(\omega) = \frac{k\gamma^2 R_T^2 R_{SA} V_0^4 \tau^2}{4\left[1+\left(2\pi n \frac{R_{SA} C_{SH}}{T}\right)^2\right](R_T+R_S)^4} \left[\frac{\sin[(2N+1)\pi\varepsilon T]}{\sin(\pi\varepsilon T)}\right]^2 \quad (37)$$

Eqs. (35) and (37) show that the ratio of $P_n'$ to $P_{n\varepsilon}'$ is given by Eq. (38) and approximated by Eq. (39).

$$\frac{P'_{n\varepsilon}(\omega)}{P'_n(\omega)} = \left[\frac{\sin[(2N+1)\pi\varepsilon T]}{(2N+1)\sin(\pi\varepsilon T)}\right]^2 \quad (38)$$

$$\frac{P'_{n\varepsilon}(\omega)}{P'_n(\omega)} \approx \left[1 - \frac{[(2N+1)\pi\varepsilon T]^2}{3}\right] \text{ for } \varepsilon \ll \frac{1}{(2N+1)\pi T} \quad (39)$$

From Eqs. (32) and (34), the FWHM linewidth for each peak ($P_{IIn\varepsilon}=P_{IIn}/2$) may be found by using iterations to solve the following equation:

$$\frac{\sin(2N\pi\varepsilon T + \pi\varepsilon T)}{\sin(\pi\varepsilon T)} = \frac{2N+1}{\sqrt{2}} \quad (40)$$

The inventor measures the MFC using a passively mode-locked laser because actively mode-locked lasers have an oscillator at the pulse repetition frequency which interferes with the measurements, so they cannot be used to measure the harmonics. When using a spectrum analyzer with an RBW of 1 Hz (acquisition time of 1.5 seconds) we see a FWHM linewidth of 1.2 Hz. However, using an RBW of 0.1 Hz (acquisition time of 15 seconds) one can see a linewidth of 0.1 Hz where there are two or more peaks in approximately 10 percent of the scans.[2] These results suggest that the length of the pulse train is approximately 10 seconds for this laser. We have used a pulse repetition frequency of 74.254 MHz corresponding to T=13.47 ns.

FIG. 6 shows the FWHM as a function of the integer N for T=13.47 ns which is typical in our measurements. These results suggest that, for a FWHM of 0.1 Hz, N is approximately $3 \times 10^8$, for $6 \times 10^8$ pulses in each pulse train. This figure is consistent with the approximate value of 10 seconds for the measured coherence time.

To enable some simple examples, one can consider the case of a sample in which $\mu\varepsilon\omega \ll 1$ so the effects of the spreading capacitance may be neglected. Then Eq. (35) may be written in the form of Eqs. (41A), (41B), and (41C), where the microwave power per unit bandwidth at the n-th harmonic is given as the product of three separate components. Note that in a specific measurement system, for any chosen harmonic, the only term that depends on the resistivity of the sample and the tip-sample distance is $E(\rho, d)$ as defined in Eq. (41C).

$$P'_n = DE(\rho, d)F(n) \quad (41A)$$

$$D = \frac{(2N+1)^2 k \gamma^2 R_{SA} V_0^4 \tau^2}{4} \quad (41B)$$

$$E(\rho, d) = \frac{R_T^2}{(R_T + R_S)^4} \quad (41C)$$

$$F(n) = \frac{1}{\left[1 + \left(2\pi n \frac{R_{SA} C_{SH}}{T}\right)^2\right]} \quad (41D)$$

IV. Simulations of the Microwave Harmonics

Simulations show that, for a sample having a fixed resistivity, the microwave power has a unique maximum which is seen at a unique value of the tip-sample distance. Furthermore, at a fixed value of the applied DC bias, the power is maximum at the largest DC tunneling current that can be obtained with that bias. Conversely, at a fixed value of the DC tunneling current the power is maximum at the smallest applied DC bias that can give that current. These effects will be seen in the following simulations.

Table I shows the simulated tip-sample distance and maximum PSD corresponding to 9 different values of the sample resistivity. While FIGS. 1 and 2 show that the spreading resistance depends on the tip-sample distance, this variation is less prominent than that for the tunneling resistance. Equation (39C) shows that if $R_S$ were constant, the power would be maximum for $R_T = R_S$. Note that for the 14 values of $R_T/R_S$ shown, the mean is 1.058 with a standard deviation of 0.016. These calculations were made for an STM having a tungsten tip with an apex radius of 0.3 nm. FIGS. 6 through 10 were prepared using simulations based on the parameters in this table.

TABLE I

Simulated tip-sample distance to obtain the maximum PSD with samples having different resistivities.

| p, Ω-cm | d, nm | $P_{MAX}$ dBm/Hz | $V_B/I_{DC}$, MΩ | $R_T$, Ω | $R_S$, Ω | $R_T/R_S$ |
|---|---|---|---|---|---|---|
| 50 | 0.494 | −187.2 | 1290. | $6.01 \times 10^8$ | $5.71 \times 10^8$ | 1.052 |
| 20 | 0.457 | −179.4 | 266. | $2.49 \times 10^8$ | $2.34 \times 10^8$ | 1.062 |
| 10 | 0.428 | −173.6 | 138. | $1.24 \times 10^8$ | $1.19 \times 10^8$ | 1.038 |
| 5 | 0.402 | −167.7 | 73.9 | $6.62 \times 10^7$ | $6.07 \times 10^7$ | 1.090 |
| 2 | 0.365 | −160.0 | 51.7 | $2.69 \times 10^7$ | $7.49 \times 10^7$ | 1.080 |
| 1 | 0.337 | −154.1 | 26.0 | $1.35 \times 10^7$ | $1.27 \times 10^7$ | 1.065 |
| .5 | 0.309 | −148.2 | 13.2 | $6.74 \times 10^6$ | $6.46 \times 10^6$ | 1.043 |
| .2 | 0.274 | −140.5 | 5.43 | $2.79 \times 10^6$ | $2.64 \times 10^6$ | 1.055 |
| .1 | 0.247 | −134.6 | 2.76 | $1.40 \times 10^6$ | $1.35 \times 10^6$ | 1.039 |
| .05 | 0.222 | −128.8 | 1.41 | $7.30 \times 10^5$ | $6.84 \times 10^5$ | 1.067 |
| .02 | 0.188 | −121.0 | 5.75 | $2.95 \times 10^5$ | $2.80 \times 10^5$ | 1.055 |
| .01 | 0.163 | −115.1 | 2.93 | $1.49 \times 10^5$ | $1.42 \times 10^5$ | 1.045 |
| .005 | 0.139 | −109.2 | 0.148 | $7.53 \times 10^4$ | $7.23 \times 10^4$ | 1.041 |
| .002 | 0.110 | −101.4 | 0.0602 | $3.17 \times 10^4$ | $2.95 \times 10^4$ | 1.075 |

FIG. 7 shows the DC tunneling current as a function of the applied DC bias for maximum microwave power at the 9 values for the sample resistivity. Note that the ratio of the applied DC bias to the DC tunneling current has a unique value at the maximum power for each sample resistivity because, as the DC bias is reduced, the set-point for the DC tunneling current must also be decreased to keep the same tip-sample distance. By contrast, in our measurements with metal samples the power at each harmonic is proportional to the square of the DC tunneling current [M. J. Hagmann, A. Efimov, A. J. Taylor and D. A. Yarotski, Appl. Phys. Lett 99, 011112 (2011)]. This difference may be understood because, when the spreading resistance is very small, the tip-sample distance to obtain maximum power is near zero. Since the MFC is not present at tip-sample contact, it was possible for us to make measurements with metal samples using currents of several microamperes at a small but non-zero tip-sample distance.

FIG. 8 shows the simulated microwave power as a function of the applied DC bias for each of the 9 tabulated values of the sample resistivity with a DC tunneling current of 100 nA. The maximum PSD occurs at the upper end in each curve which corresponds to the minimum value for the applied bias at which the set-point current of 100 nA can be obtained. Thus, at the corresponding point for each of the 9 lines, increasing the set-point value for the tunneling current or reducing the applied DC bias would cause the tunneling to cease. However, for ρ=0.002 Ω-cm, on the last line of Table I, the minimum value of d is 0.053 nm at which P=−108.8 dBm/Hz which is 7.4 dB below $P_{MAX}$. We recognize that this result is beyond what can be justified with our present approximations because d is sub-atomic, but this appears to show the beginning of a transition to the behavior for a metal sample.

FIG. 9 shows simulated values for the maximum PSD at each value of the tip-sample distance where each point corresponds to a different value of the sample resistivity. At each value of the resistivity the simulations for multiple values of the DC tunneling current and the applied DC bias coincide. Notice that the maximum PSD decreases exponentially as a function of the tip-sample distance.

FIG. 10 shows simulated values of the maximum PSD corresponding to each value of the sample resistivity, where the results of simulations for multiple values of the DC tunneling current and the applied DC bias coincide. This figure shows that the maximum microwave power varies as the inverse square of the sample resistivity.

The present invention is a methodology for sample characterization which surpasses the prior art in that it uses the PSD of a given harmonic to serve as a control criterion for controlling the distance between the tip electrode and the sample in a tunneling junction. Since the methodology works this feedback control without a DC bias, this component of previous technology may be eliminated. Likewise, no separate surface probe is needed to characterize the sample.

The present invention represents a departure from the prior art in that the method of sample characterization of the present invention allows for use independent of a surface probe and optional use of a DC bias.

SUMMARY OF THE INVENTION

In view of the foregoing disadvantages inherent in the known types of characterization methodologies, an improved scanning methodology which utilizes measured power as a control criterion may provide a method that meets the following objectives: that it be simple to implement, that it be effective in avoiding tip crash, that it reduces the necessary components in the circuit and system to characterize a sample. As such, a new and improved method may comprise providing a tunneling junction, such as from an STM, with a tip electrode and a sample electrode and irradiating it with pulsed electromagnetic radiation to create a microwave frequency comb in the tunneling junction. Then measuring the power in the microwave frequency comb to provide a criterion for use in feedback control of the tip-sample distance in the tunneling junction to accomplish these objectives.

The more key features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in numerous ways. Also, it is to be understood that the phraseology and terminology employed herein are for description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

With reference now to the drawings, a preferred embodiment of the method of Frequency Comb Feedback Control for Scanning Probe Microscopy is herein described. It should be noted that the articles "a," "an," and "the," as used in this specification, include plural referents unless the content clearly dictates otherwise.

Figure 1:
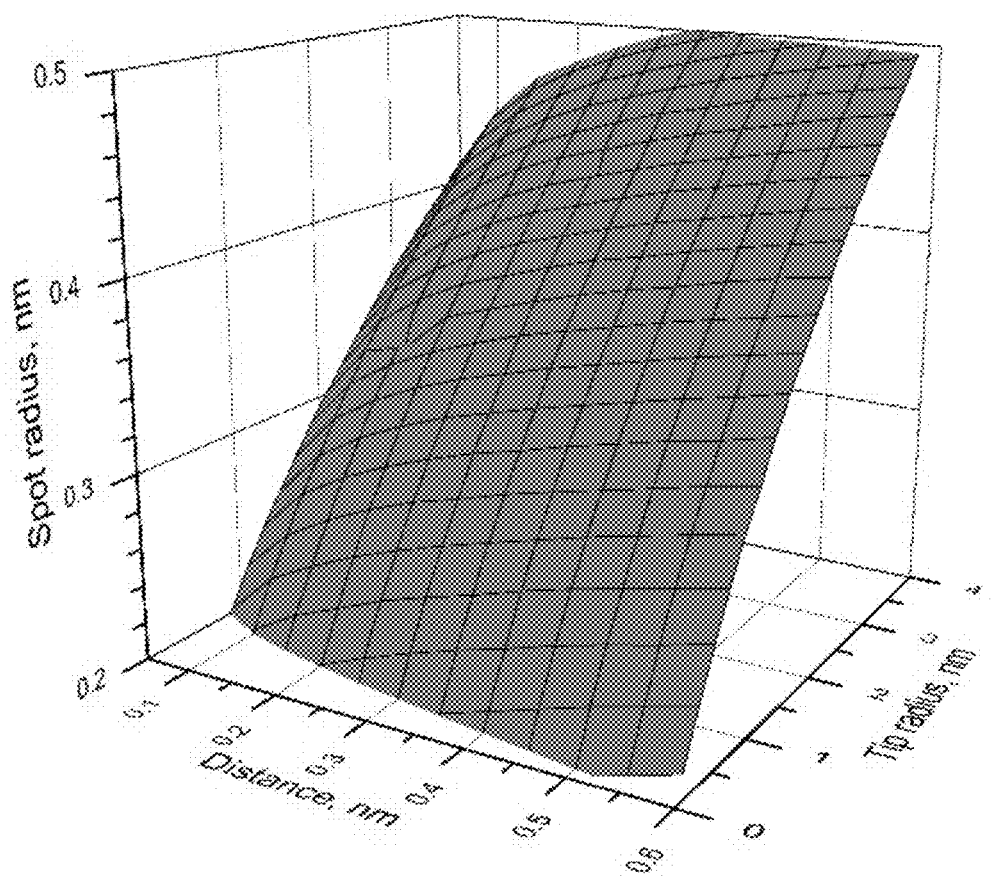
FIG. 1 (Prior Art) shows the spot-radius (for a circle containing one-half of the tunneling current) at the surface of a resistive sample as a function of the tip-sample distance and the tip radius.
Figure 2:
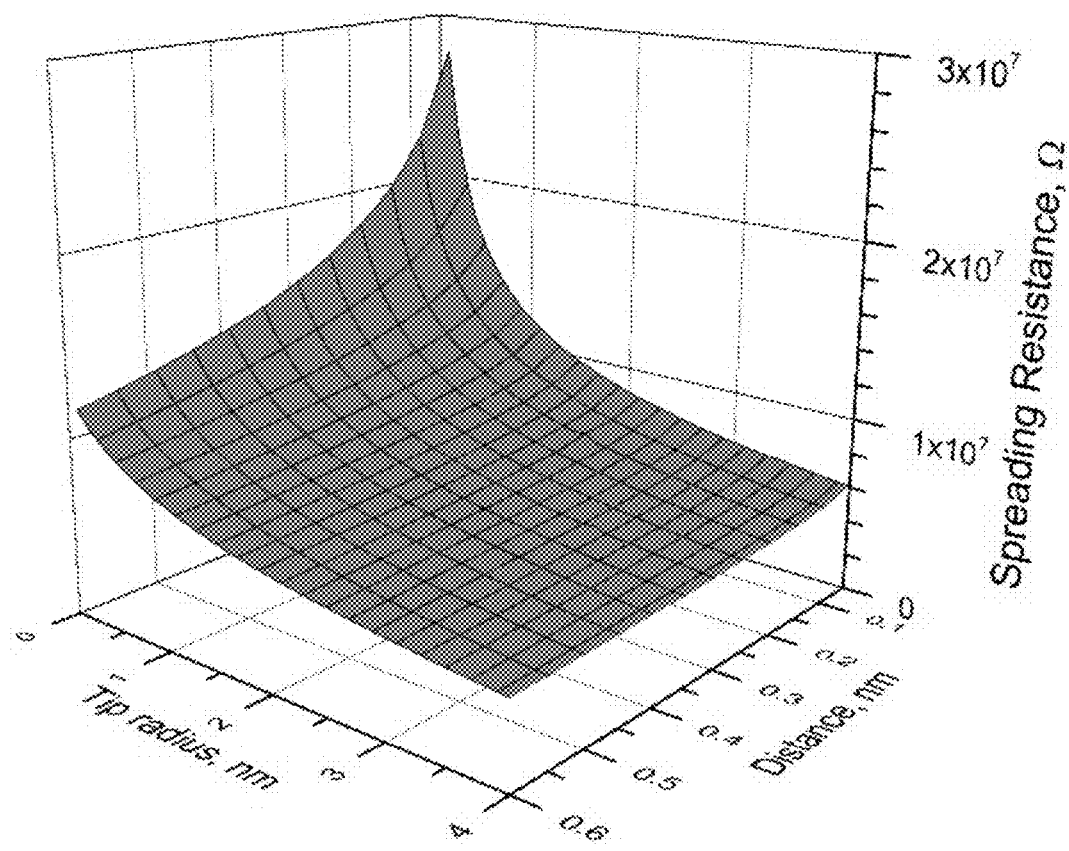
FIG. 2 (Prior Art) shows the simulated spreading resistance as a function of the tip radius and the tip-sample distance.
Figure 3:
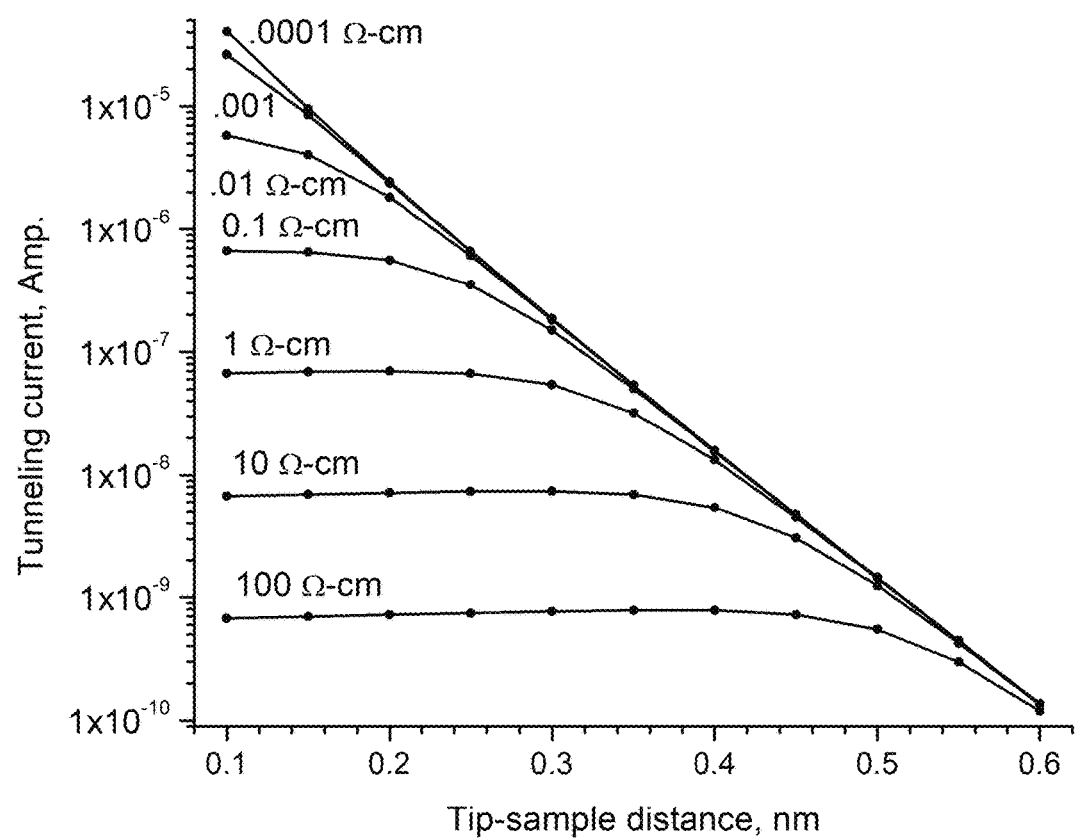
FIG. 3 (Prior Art) is a graph depicting tunneling current vs. tip-sample distance for an applied bias of 1 V with a tungsten tip and 7 sample resistivities.
Figure 4:
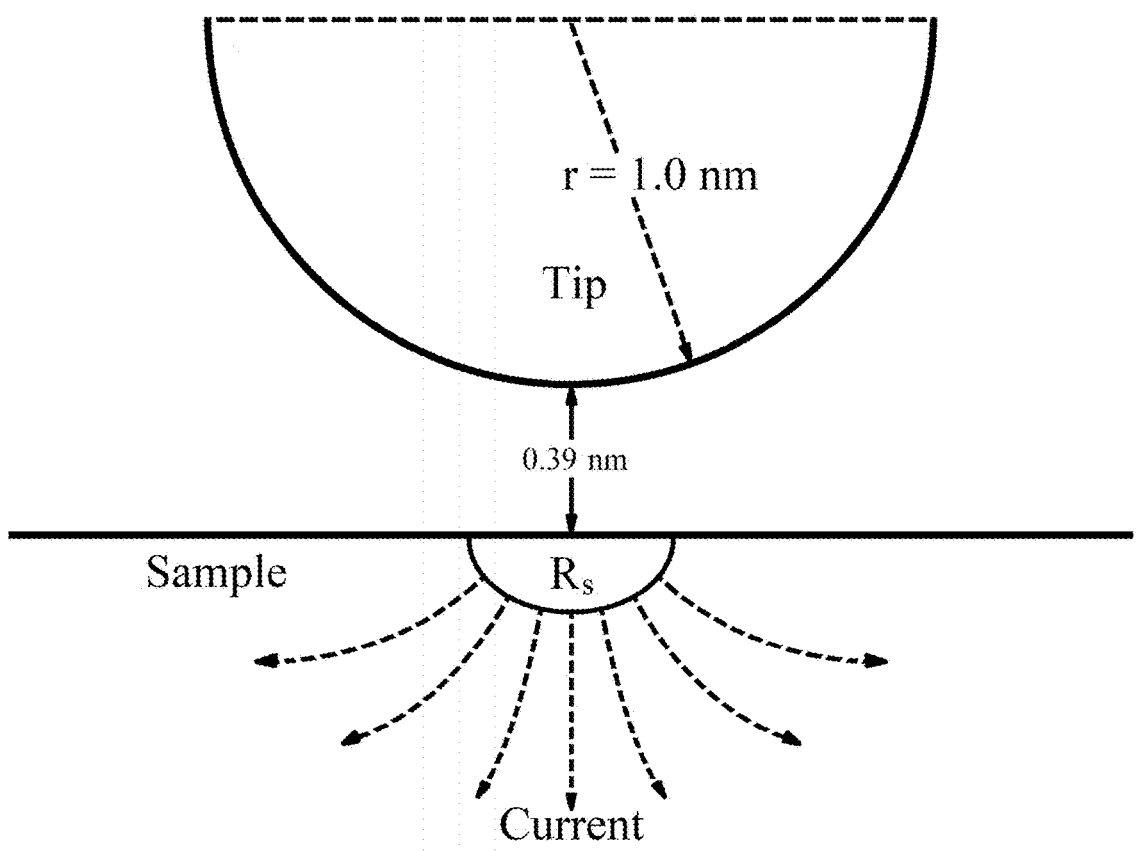
FIG. 4 (Prior Art) is a schematic of a tunneling junction for measuring a microwave frequency comb.
Figure 5:
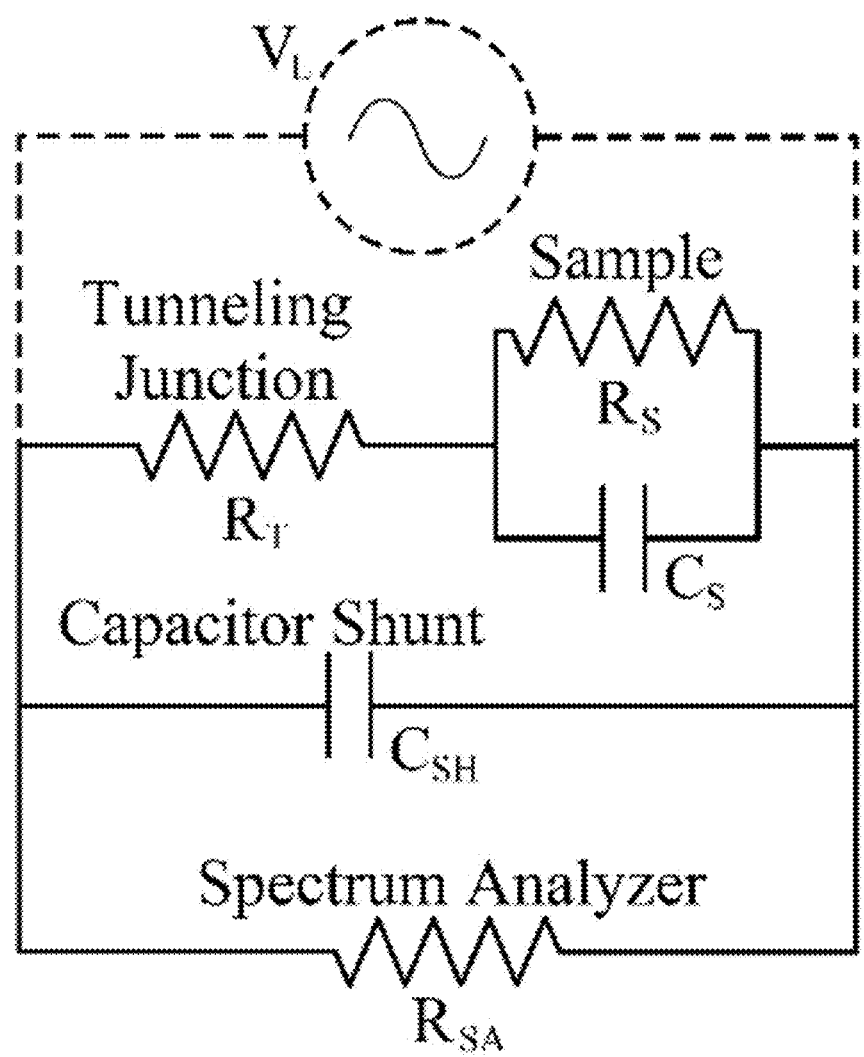
FIG. 5 (Prior Art) is a block diagram of an equivalent circuit for measurement of the microwave frequency comb when the laser is focused on both the tunneling junction and the spreading resistance.
Figure 6:
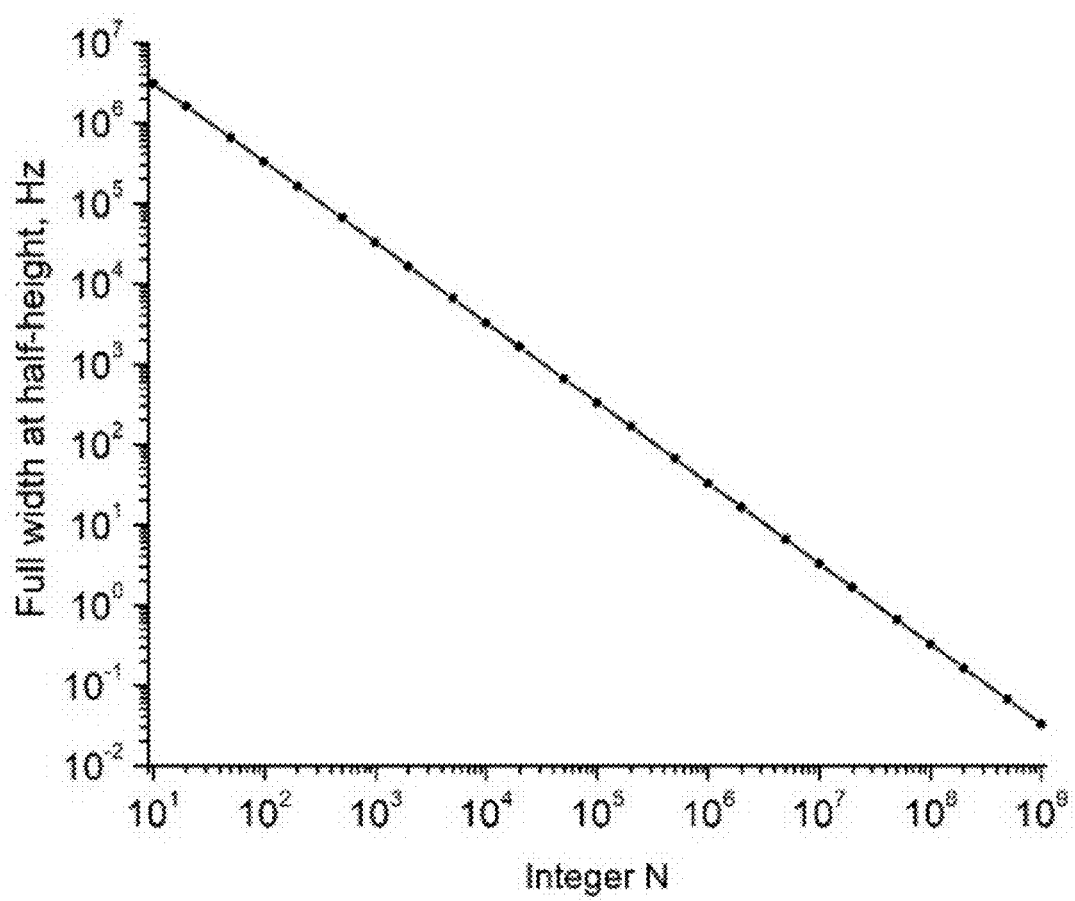
FIG. 6 (Prior Art) is a graph depicting linewidth (FWHM) vs. N, simulated for no phase jitter.
Figure 7:
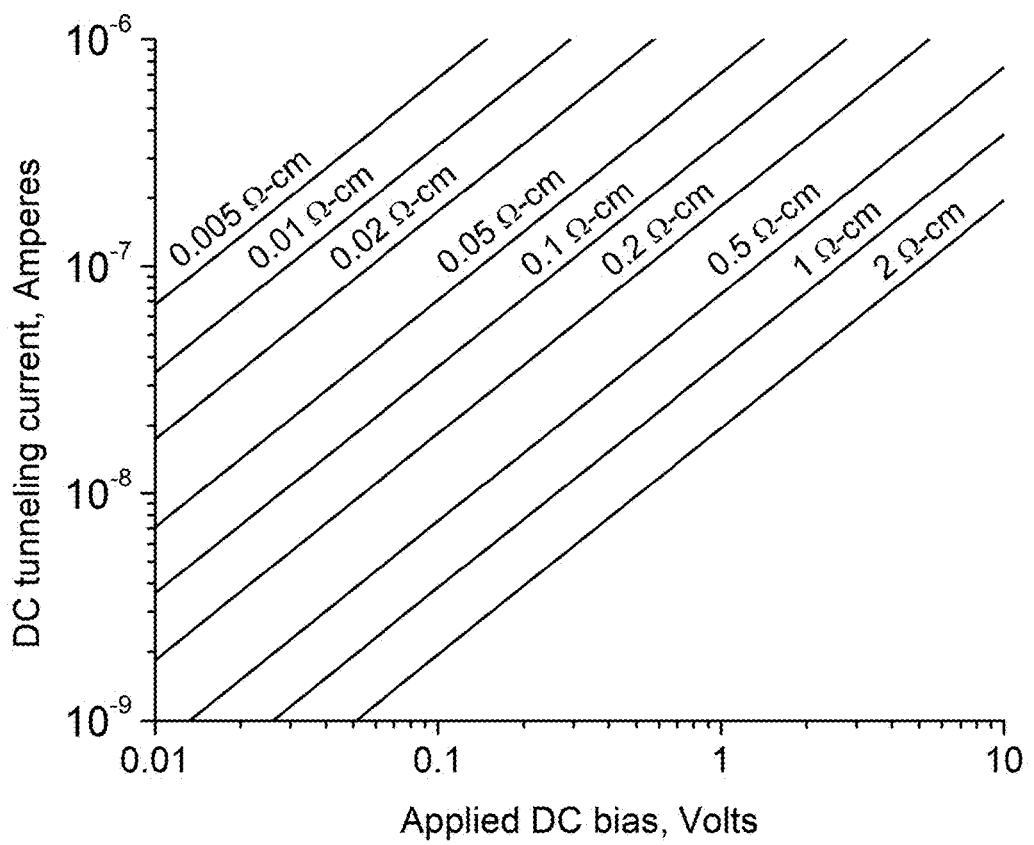
FIG. 7 (Prior Art) is a graph depicting DC tunneling current vs. applied bias for maximum PSD at 9 different values of sample resistivity in the prior art methodology.
Figure 8:
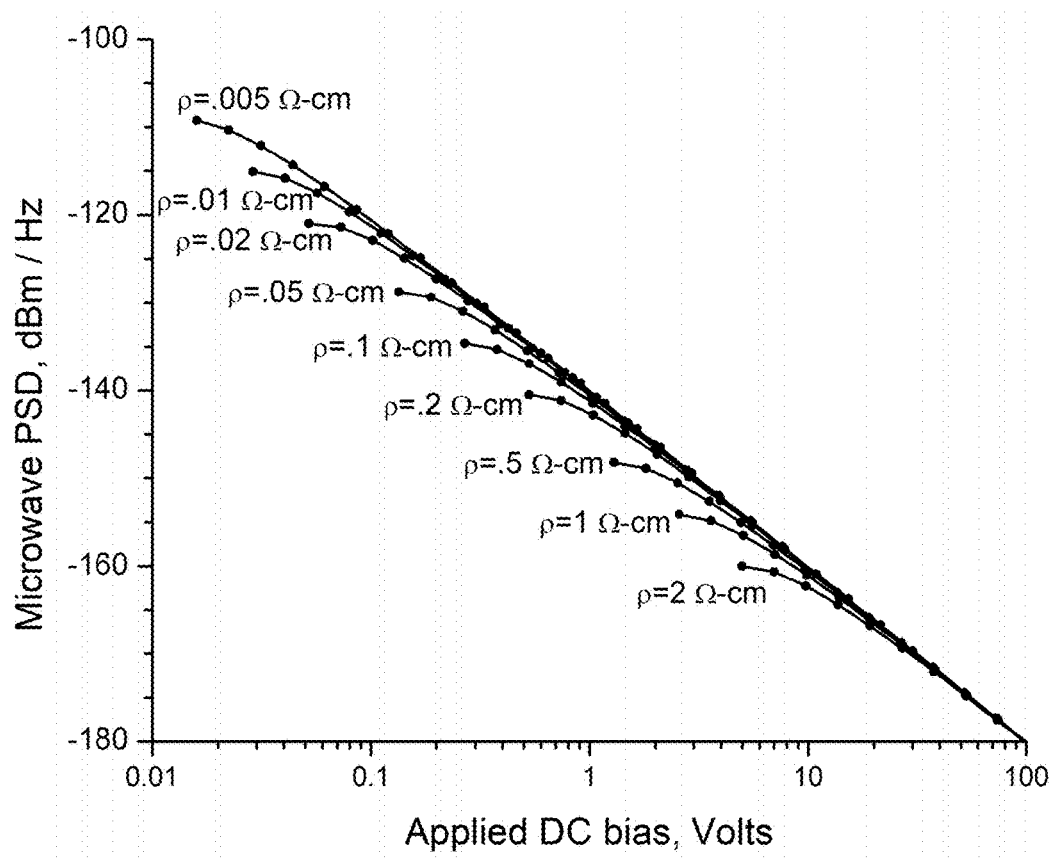
FIG. 8 (Prior Art) is a graph of the PSD vs. applied bias at 9 different values of sample resistivity with a DC tunneling current of 100 nA in the prior art methodology.
Figure 9:
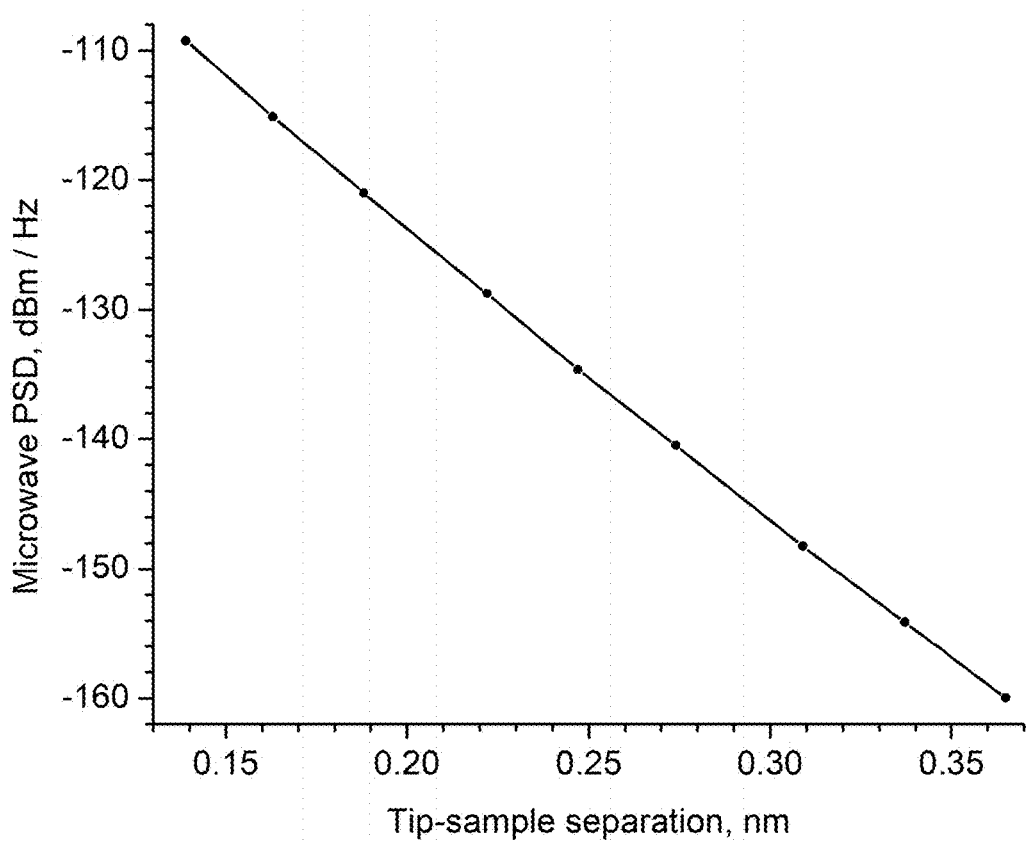
FIG. 9 (Prior Art) is a graph showing simulated values of the maximum PSD at each tip-sample distance, which correspond to different values of the applied bias and the sample resistivity in the prior art methodology.
Figure 10:
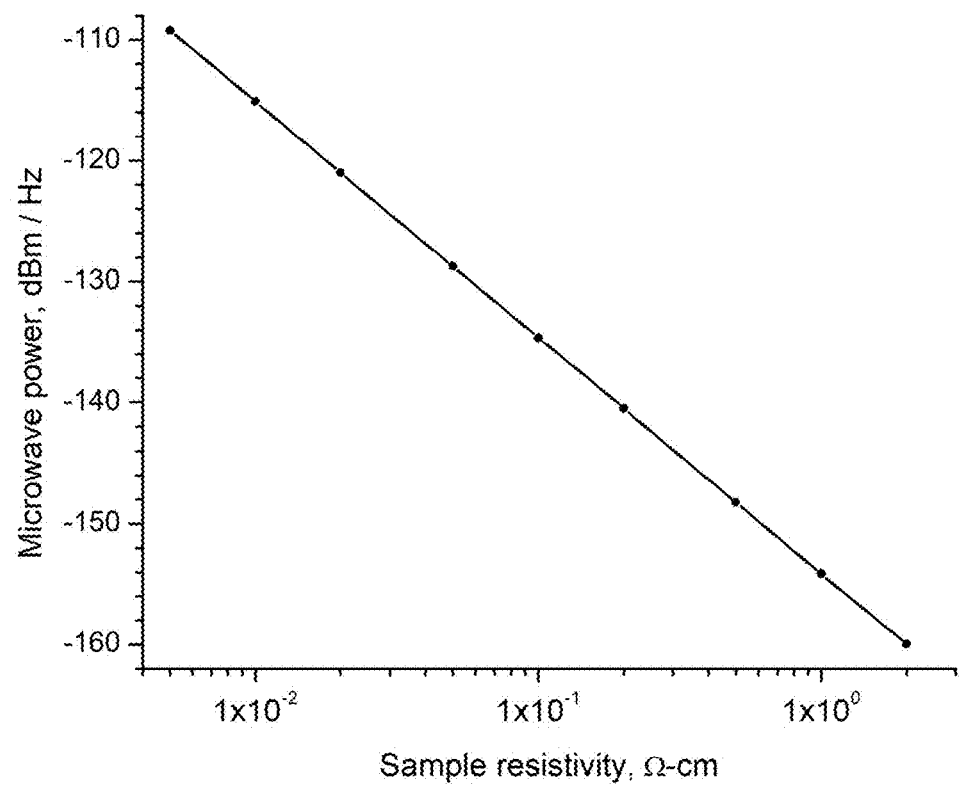
FIG. 10 (Prior Art) is a graph showing simulated values of the maximum PSD vs. sample resistivity, which correspond to different values of the applied bias and the DC tunneling current in the prior art methodology.
Figure 11:
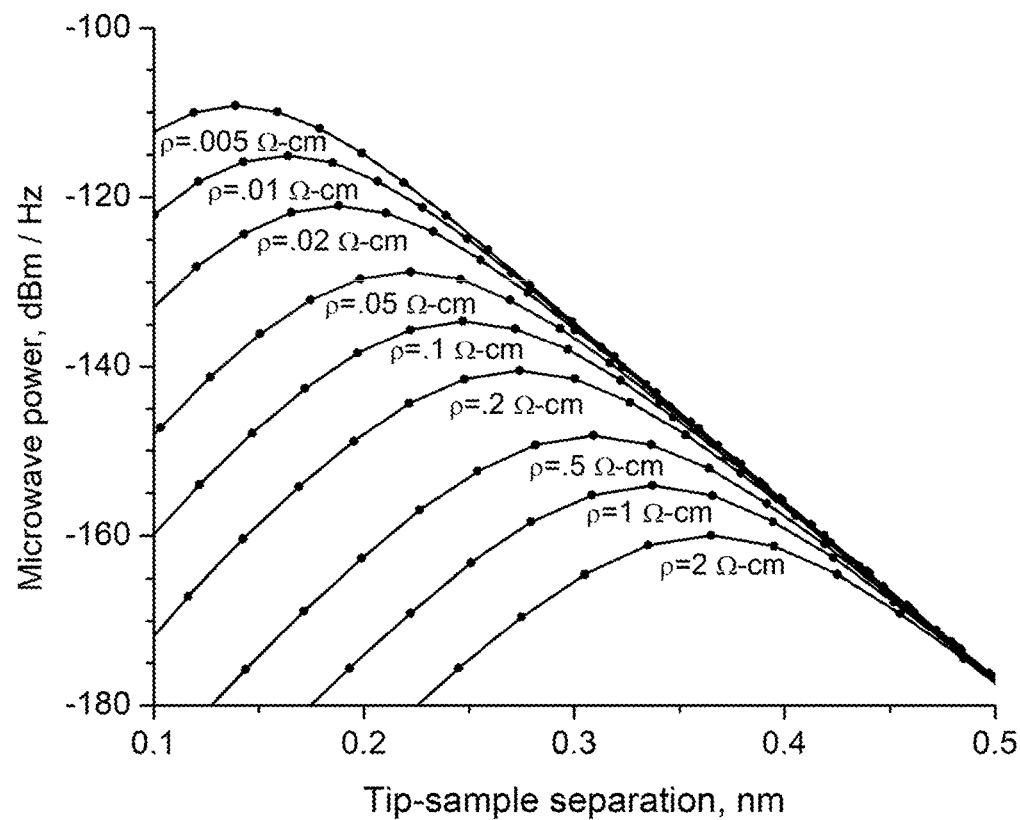
FIG. 11 is a graph depicting PSD vs. tip-sample distance for different values of the sample resistivity when there is no applied DC bias.

FIG. 11 shows simulated values for the PSD as a function of the tip-sample separation when there is no applied DC bias, and consequently no DC tunneling current. These calculations were made for a tungsten tip having an apex radius of 0.30 nm with different values of the sample resistivity. The harmonics are believed to be generated by optical rectification, so any DC applied bias and the DC tunneling current would not directly contribute to the microwave power and in previous methods only have the role of establishing the tip-sample distance for maximum power. Thus, it is possible to use the dependence of the microwave power on the tip-sample distance as the criterion for feedback control of the tip-sample distance. Note that in the FIG. 11 each individual resistivity plot has a peak at some point before each one drops towards having no power as the tip-sample separation approaches 0.1 nm. A "peak-seeking algorithm" may be utilized to find each peak of measured power before it drops towards zero as the tip separation either increases or decreases. In so doing, a minimum distance may be maintained, and the system can avoid tip crash. Likewise, the system can remain active and not overcompensate and have a separation that is too large. For example, the voltage to the piezoelectric actuator could be offset to enable rapid sequential measurements of the microwave power at several tip-sample distances and these data points could be used to remain centered near the distance for maximum microwave power. Note FIG. 3, where prior art systems show a leveling of the tunneling current as the distance between the tip and sample is reduced. This lack of a defined peak shows the futility of utilizing tunneling current, or DC bias, as a safeguard to prevent tip crash. This is markedly different than what is shown in FIG. 11, where each peak exists and can be used to establish an optimum distance.

Figure 12:
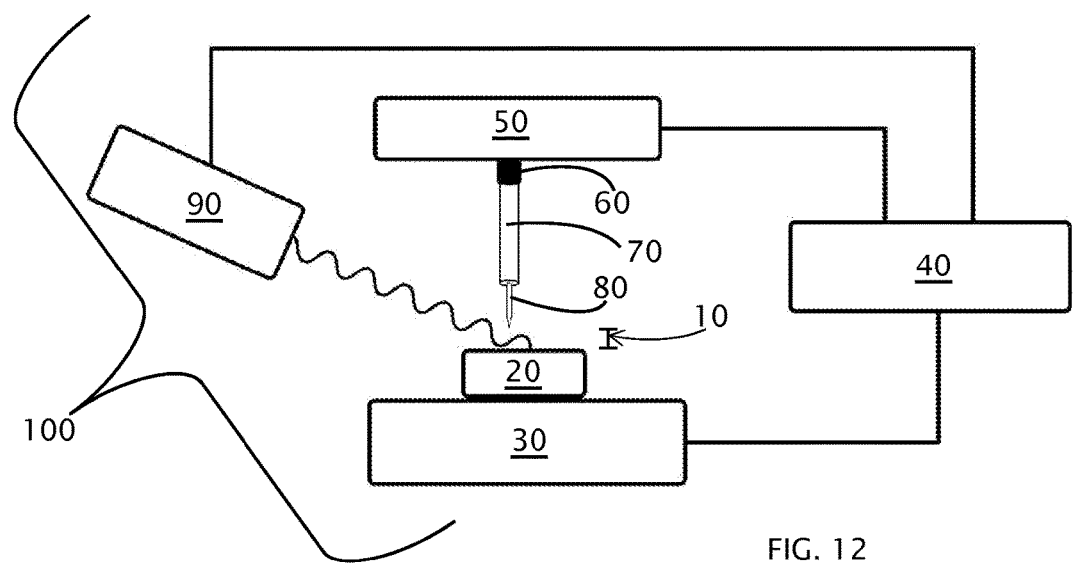
FIG. 12 is a block diagram depicting scanning frequency comb microscopy when there is no applied DC bias.

FIG. 12 is a block diagram of a system to provide feedback control of the tip-sample distance based on the power at the microwave harmonics in Scanning Frequency Comb Microscopy (SFCM) when there is no applied DC bias. Here an "applied" DC bias would be any DC bias intentionally added from outside of the system 100 defined by the tunneling junction 10, its necessary components, the mode-locked laser 90, and the analysis and control systems 40. Direct current may be generated within the system 100, such as between the tip 80 and sample 20 if there is enough difference in their respective work functions; but, for purposes of this Application, this type of naturally occurring, unintentional, direct current would not be an "applied" DC bias.

In FIG. 12, a tunneling junction 10 is formed between a sample 20 and a tip electrode 80 at the end of a semi-rigid coaxial cable 70. The sample 20 is mounted upon some means of movement, such as piezoelectric actuators and/or stepper motors 30, which are controllably connected to a feedback control 40. The feedback control 40 may or may not also serve as a data analysis unit as it is also connected to a spectrum analyzer 50 which is, in turn, connected to the coaxial cable 70 and tip electrode 80 through a DC block 60 (to protect the analyzer from native DC biases). The mode-locked laser 90 is also connected to the feedback control and data analysis unit 40.

SFCM can be a more than sufficient means for determining the local resistivity of a sample by measuring the microwave power that is produced in a tunneling junction by a mode-locked laser. However, SFCM may also be useful with a high resistivity sample when only the typography is of interest because of its improved stability.

SFCM may be performed by scanning the tip over the surface of a sample with a constant set-point current (or a constant applied DC bias) while adjusting the applied DC bias (or the set-point current) to maximize the microwave power at each point in the scan. However, it appears to be preferable to use a system such as that shown in FIG. 11 where there is no applied DC bias due to the following advantages:
1. The drift and noise in the systems that would be required for the bias supply and measurement of the current are eliminated.
2. The mode-locked laser provides the only source of potential in the system and its duty cycle is small.
3. By avoiding the application of a DC voltage and the injection of a DC current into the sample it may be possible to use other forms of nanoprobing as the SFCM measurements are made.
4. Eliminating the applied DC bias would reduce stress on the tip and increase the stability in the measurements. We estimate that during each laser pulse the peak value for the incident electric field from the laser is approximately $3.6 \times 10^7$ V/m. The electric field at the apex of the metal tip is further intensified by a factor of 100 to 1,000 from the "lightning-rod effect" [A. Hartschuh, Angew. Chem. Int. Ed. 47 8178-8191 (2008); A. Downes, D. Salter and A. Elfick, J. Phys. Chem. B 110 6692-6698 (2006); A. V. Ermushev, B. V. Mchedlishvili, V. A. Oleinikov and A. V. Petukhov, Quantum Electron. 23 435-440 (1993)]. For comparison, with a DC bias of 1 V and a tip-sample distance of 0.3 nm the mean value of the DC electric field in the tunneling junction of an STM would be $3 \times 10^9$ V/m and the value at the apex of the tip would be several times greater depending on the curvature of the tip. Thus, the peak value of the electric field at the apex which is caused by the laser in SFCM would be comparable to the DC electric field at the apex in an STM. However, the DC electric field would be continuous whereas the electric field caused by the laser typically has a duty factor of $10^{-6}$. Thus, we conclude that in SFCM with no applied bias there may be much less stress on the tip.

Thus far we have only made SFCM measurements in an STM when there is an applied DC bias. However, our measurements made using the laser with an STM show that it is essential to optimize the sharpness and cleanliness of the tip. Others have noted the importance of the shape of the tip in studies of Tip-Enhanced Raman Spectroscopy (TERS) where they also use a metal tip as an optical nanoantenna [X. Shi, N. Coca-Lopez, J. Janik and A. Hartschuh, Chem. Rev. 117, 4945-4960 (2017)]. In SFCM it may be possible to further enhance the effect of the laser radiation by coating the tip with silver or gold to create surface plasmons as is already done in TERS [Z. Zhang, S. Sheng, R. Wang and M. Sun, Anal. Chem. 88, 9328-9346 (2016)]. It is important to recognize that the resolution in carrier profiling by SFCM may be much finer than the spot-radius for the tunneling current because the laser radiation is focused more sharply by the tip acting as an optical nanoantenna. By analogy, sub-nanometer resolution is already achieved in TERS because of the near-field intensification by the sharp tip [Shi, supra]. Thus, sub-nanometer resolution is likely when using a sharp tip in SFCM.

Possible Applications

Roadmaps for the semiconductor industry request that the carrier concentration be measured at a resolution finer than 10 percent of the dimension for each lithography node, but this cannot be satisfied with present instrumentation at or below the 10-nm node. Scanning Spreading Resistance Microscopy (SSRM) is generally the method of choice for carrier profiling at the finer nodes. In SSRM high pressure is required to insert a diamond probe that must be normal to the flat surface of a semiconductor to measure the spreading resistance. The diamond probes have an initial diameter of 10-15 nm and blunt to 50 nm or more during each set of measurements. However, in Scanning Frequency Comb Microscopy (SFCM) we would measure the spreading resistance with a tunneling junction of sub-nanometer size in place of the diamond probe to provide finer resolution while mitigating damage to the semiconductor. SFCM also shows promise for measurements with fragile 2-D materials such as graphene and molybdenum disulfide, as well as with 3-D structures such as FinFETs without requiring their disassembly.

Rather than attempting to make an absolute determination of the carrier density, we choose to use a substitution method that is analogous to what is already applied to interpret the data in SSRM. Thus, we would make consecutive measurements of the microwave power with the test samples and standards under controlled conditions. Standards like those that are now used in SSRM, which are silicon wafers having multiple sections with different known values for the carrier concentration, may be used ['MEC scanning spreading resistance microscopy standards SSRM-SMPL-N and SSRM- SMPL-P available at www.brukerafmprobes.com]. Each test sample and each section of the standard would be cleaved and cleaned by the same processes, and then tested under the same controlled conditions. Values for the maximum microwave power that are measured with the standards would be interpolated to determine the resistivities of the unknown samples.

CONCLUSIONS

1. A mode-locked laser focused on a tunneling junction with a metal tip and metal sample with sub-nm spacing generates hundreds of microwave harmonics at integer multiples of the laser pulse-repetition frequency.
2. Each harmonic sets the present state-of-the-art for narrow linewidth in a microwave source, which enables detecting the harmonics at attowatt power with a 20-dB ratio of signal-to-noise.
3. With a resistive sample, such as a semiconductor, the harmonics are attenuated by the spreading resistance in the sample, so the resistivity may be determined at nanoscale from the measurements.
4. For each value of the sample resistivity the microwave power has a unique maximum at a unique value of the tip-sample distance.
5. This unique distance may be obtained with different pairs of values for the applied DC bias and the DC tunneling current in an STM that have a ratio that is unique for each sample resistivity.
6. The microwave power is maximum at a tip-sample distance for which the tunneling resistance is equal to the spreading resistance in the sample as a matched load.
7. This unique distance may be found and maintained, without applying a DC bias, by maximizing the microwave power as the criterion for feedback control instead of the accepted means of basing the feedback control on a set-point value for the DC tunneling current.
8. For low values of the sample resistivity the tip-sample distance becomes small for a smooth transition to the case for a perfectly-conducting sample where that distance would approach zero but there would be no tip-sample contact.
9. Scanning Frequency Comb Microscopy (SFCM) shows promise as a new method in Scanning Probe Microscopy to provide finer resolution in topography with resistive samples as well as the nondestructive carrier profiling of semiconductors with true sub-nanometer resolution.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A method of sample characterization, the method comprising:
    placing a sample as an electrode proximate a tip electrode in a circuit, thereby forming a tunneling junction with a distance between the sample and tip electrodes;
    irradiating the tunneling junction with pulsed electromagnetic radiation thereby creating a microwave frequency comb within the tunneling junction;
    measuring a power of at least one harmonic within the microwave frequency comb; and
    changing the distance between the sample and tip electrodes and remeasuring the power of the same at least one harmonic within the microwave frequency comb, then comparing the second measured power to the first to determine which is greater and repeating this last step until a maximum power is found.
2. The method of claim 1, wherein there is no applied voltage to the tunneling junction.
3. The method of claim 1, the sample being a semiconductor sample.
4. The method of claim 1 the circuit further comprising a detector for the microwave frequency comb.
5. The method of claim 4, the detector being a spectrum analyzer and the circuit further comprising a DC block.
6. The method of claim 1, the pulsed electromagnetic radiation being generated by a mode-locked laser.
7. The method of claim 1, the distance between the tip electrode and sample being controlled by a peak seeking algorithm utilizing the measured power as the criterion.

* * * * *